(12) United States Patent
Ohide (10) Patent No.: US 8,199,376 B2
(45) Date of Patent: Jun. 12, 2012

(54) IMAGE FORMING APPARATUS AND IMAGE FORMING METHOD

(75) Inventor: Toshio Ohide, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 480 days.

(21) Appl. No.: 12/559,950

(22) Filed: Sep. 15, 2009

(65) Prior Publication Data

US 2010/0067069 A1 Mar. 18, 2010

(30) Foreign Application Priority Data

Sep. 16, 2008 (JP) ................................. 2008-236448
Sep. 10, 2009 (JP) ................................. 2009-209808

(51) Int. Cl.
*H04N 1/04* (2006.01)

(52) U.S. Cl. .......... 358/474; 358/1.9; 358/1.2; 347/131; 347/133; 395/139

(58) Field of Classification Search .................. 358/474, 358/1.9, 1.2, 3.26, 2.1; 347/131, 133, 140, 347/235, 250; 395/139
See application file for complete search history.

(56) References Cited

U.S. PATENT DOCUMENTS

| | | | | |
|---|---|---|---|---|
| 5,325,212 A * | 6/1994 | Endo et al. | ................ | 358/468 |
| 5,875,044 A * | 2/1999 | Seto et al. | .................. | 358/518 |
| 6,833,856 B2 * | 12/2004 | Maeda | ................. | 347/248 |
| 7,344,217 B2 * | 3/2008 | Kitamura et al. | ............. | 347/15 |
| 7,391,003 B2 * | 6/2008 | Nomura et al. | ............ | 250/208.1 |
| 7,755,809 B2 * | 7/2010 | Fujita et al. | ................. | 358/474 |
| 7,770,994 B2 * | 8/2010 | Kitamura et al. | ............. | 347/15 |
| 2008/0218723 A1 | 9/2008 | Ohide et al. | | |
| 2008/0309951 A1 | 12/2008 | Kishi et al. | | |
| 2009/0059255 A1 | 3/2009 | Ohide | | |

FOREIGN PATENT DOCUMENTS

| | | |
|---|---|---|
| JP | 2003-255247 | 9/2003 |
| JP | 2007-10765 | 1/2007 |
| JP | 4260616 | 2/2009 |

* cited by examiner

*Primary Examiner* — Negussie Worku (74) *Attorney, Agent, or Firm* — Oblon, Spivak, McClelland, Maier & Neustadt, L.L.P.

(57) ABSTRACT

An image forming apparatus includes a VCSEL that includes a plurality of light sources emitting light beams, an image processing unit, and write control units that send a sub-scanning start reference signal indicating a reference for starting image formation in a sub-scanning direction and start a control of driving the light sources for each of a plurality of colors when receiving image data from the image processing unit. The write control units perform a control of outputting the sub-scanning start reference signal at timing of any of a plurality of areas divided by the number of lines scanned simultaneously in a scan cycle in a main-scanning direction.

8 Claims, 7 Drawing Sheets

IMAGE FORMING APPARATUS AND IMAGE FORMING METHOD

CROSS-REFERENCE TO RELATED APPLICATIONS

The present application claims priority to and incorporates by reference the entire contents of Japanese Patent Application No. 2008-236448 filed in Japan on Sep. 16, 2008 and Japanese Patent Application No. 2009-209808 filed in Japan on Sep. 10, 2009.

BACKGROUND OF THE INVENTION

1. Field of the Invention

The present invention relates to an image forming apparatus and an image forming method.

2. Description of the Related Art

Typically, a color image forming apparatus includes a plurality of image forming units for forming a multicolor image. The image forming apparatus adjusts a registration in a sub-scanning direction at the timing to start an image forming operation with a system operation start signal generated based on a signal detected by a registration sensor. The registration sensor detects a position of a recording medium such as a printing sheet and outputs the start signal. As such color image forming apparatus, for example, a tandem-type color image forming apparatus is known, in which image forming units, such as photosensitive elements, for respective colors are aligned along a conveying belt so called an intermediate transfer belt. In the tandem-type color image forming apparatus, images of respective colors formed by the image forming units are superimposed at the same position of the intermediate transfer belt and the superimposed color images are transferred onto a printing sheet by a transferring unit. The intermediate transfer belt is an endless belt supported by a plurality of rollers with a predetermined tension, and is driven to move at a constant speed in a predetermined direction by a drive unit that rotates a driving roller.

In such a tandem-type color image forming apparatus, each image forming unit starts image formation at a different timing, so that an operation start signal for the entire system is generated based on a signal detected by a sensor, such as the registration sensor, that detects a position of a printing sheet. Then, timing to start an image forming operation is adjusted for each color based on the operation start signal, thereby changing a registration amount in the sub-scanning direction.

For example, Japanese Patent Application Laid-open No. 2005-178080 discloses a technology for controlling color registration in the sub-scanning direction in units of line in a tandem-type color image forming apparatus by the following method. That is, in a write control unit as an image forming unit, a system operation start signal that is a perfect asynchronous operation signal is controlled in units of line cycle by a synchronous detection signal that is a reference signal of the write control unit, and a reference position of starting sub-scanning for each color is timing controlled by the synchronous detection signal.

On the other hand, in recent years, a technology is put into practical use for improving a printing speed, in which a plurality of lines (e.g., 8 to 10 lines) is scanned in one scanning by using an optical deflector such as a polygon mirror to form an electrostatic latent image in units of a plurality of lines in each scanning.

The technology disclosed in Japanese Patent Application Laid-open No. 2005-178080 enables control of color registration in units of scanning in the sub-scanning direction. However, in a color image forming apparatus that forms a latent image in units of a plurality of lines in each scanning, a position in the sub-scanning direction cannot be controlled in unit of line in one scanning.

SUMMARY OF THE INVENTION

It is an object of the present invention to at least partially solve the problems in the conventional technology.

According to an aspect of the present invention, there is provided an image forming apparatus including an image processing unit that performs image processing on image data as an image forming target; a plurality of light sources that is controlled to be driven to emit light beams; an image forming unit that forms a latent image of the image data on an image carrier by scanning the image carrier with a plurality of light beams corresponding to a plurality of lines in a main-scanning direction simultaneously; and a write control unit that, upon receiving an instruction of starting an image forming operation, sends a sub-scanning start reference signal indicating a reference of start of an image formation in a sub-scanning direction to the image processing unit, and that, upon receiving the image data from the image processing unit, starts control of driving the light sources for each of a plurality of colors. Upon receiving the sub-scanning start reference signal, the image processing unit transfers the image data on which the image processing is performed to the write control unit. The write control unit changes a printing operation start position in the sub-scanning direction in units of line by controlling to output the sub-scanning start reference signal at timing of any one of a plurality of areas divided by number of lines that are scanned simultaneously in a scan cycle in a main-scanning direction.

According to another aspect of the present invention, there is provided an image forming method that is performed in an image forming apparatus that includes a plurality of light sources that is controlled to drive to emit light beams; and an image forming unit that forms a latent image of image data as an image forming target by scanning with a plurality of light beams corresponding to a plurality of lines in a main-scanning direction simultaneously. The image forming method including performing image processing on the image data by an image processing unit; and write controlling including sending a sub-scanning start reference signal indicating a reference of start of an image formation in a sub-scanning direction to the image processing unit by a write control unit upon receiving an instruction of starting an image forming operation, and starting control of driving the light sources for each of a plurality of colors by the write control unit upon receiving the image data from the image processing unit. The performing includes transferring the image data on which the image processing is performed from the image processing unit to the write control unit upon receiving the sub-scanning start reference signal. The write controlling includes changing a printing operation start position in the sub-scanning direction in units of line by controlling to output the sub-scanning start reference signal at timing of any one of a plurality of areas divided by number of lines that are scanned simultaneously in a scan cycle in a main-scanning direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image forming apparatus and an image forming method according to the present invention are explained in detail below with reference to the accompanying drawings.

Figure 1:
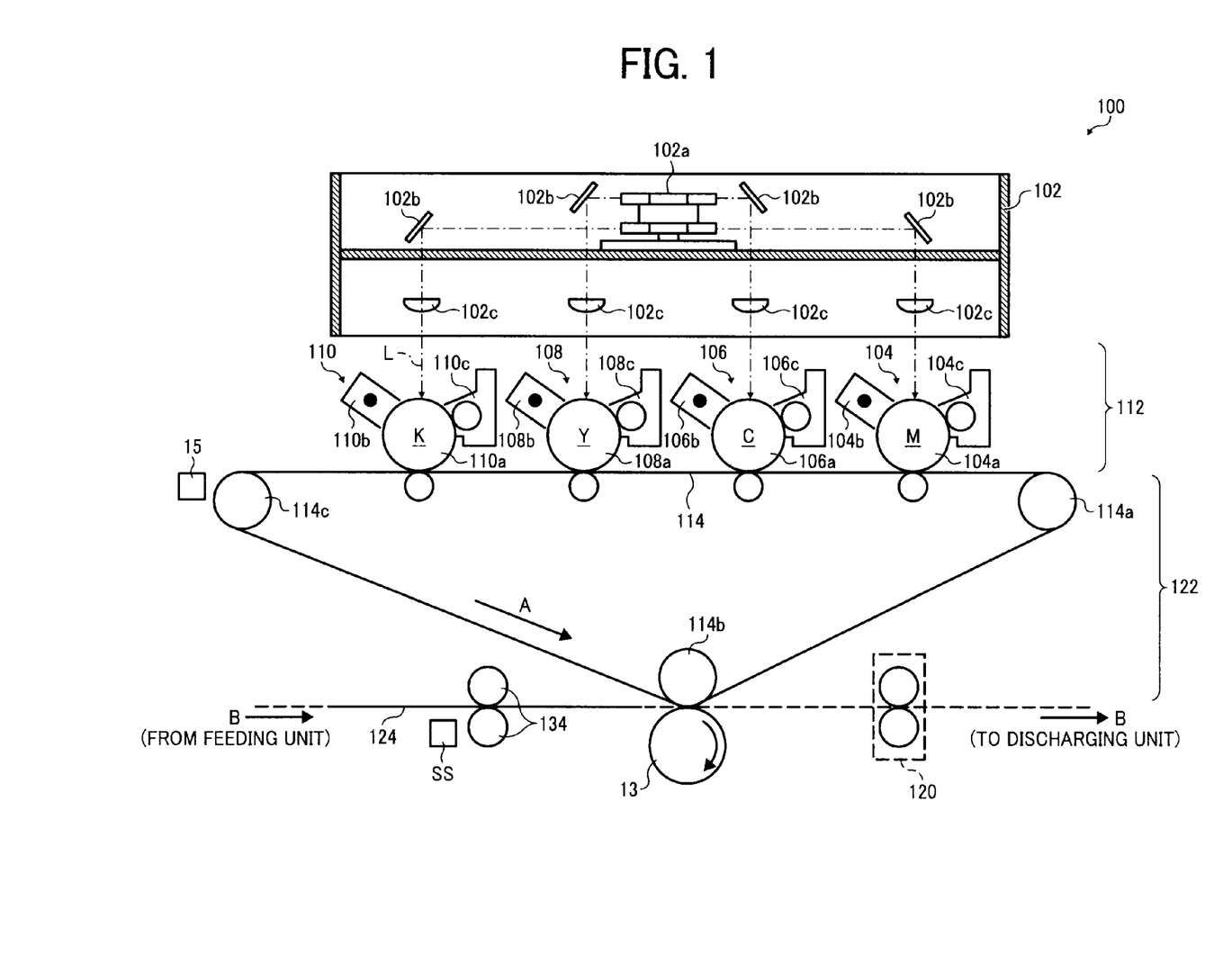
FIG. 1 is a schematic diagram illustrating a configuration of an image forming apparatus according to a first embodiment of the present invention.

FIG. 1 is a schematic diagram illustrating a configuration of an image forming apparatus 100 according to a first embodiment of the present invention. The image forming apparatus 100 includes an optical device 102 that includes an optical component such as a VCSEL 200 (see FIGS. 2 and 3) and a polygon mirror 102a, an image forming unit 112 that includes a photosensitive element as an image carrier, a charging unit, and a developing unit, and a transferring unit 122 that includes an intermediate transfer belt 114. In the embodiment shown in FIG. 1, a light beam (laser beam) emitted from the VCSEL 200 is once focused by a first cylindrical lens 202 (see FIG. 3), and is deflected to a reflecting mirror 102b by the polygon mirror 102a.

Figure 2:
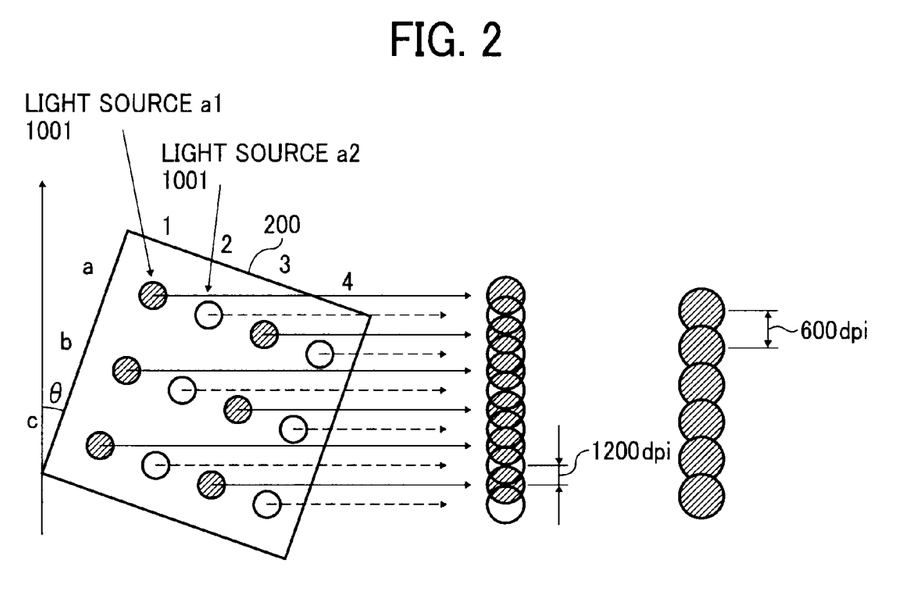
FIG. 2 is a configuration diagram of a vertical cavity surface emitting laser (VCSEL)

The VCSEL 200 is a surface emitting semiconductor laser element in which a plurality of semiconductor laser elements (light source) is arranged on a single chip in a grid pattern. Various technologies are known about an image forming apparatus including such VCSEL. In the optical device 102 in the present embodiment, the VCSEL 200 is incorporated in the similar manner to the configuration of the known technologies. FIG. 2 is a schematic diagram illustrating a configuration of the VCSEL 200 incorporated in the optical device 102. As shown in FIG. 2, the VCSEL 200 constitutes a semiconductor laser array in which a plurality of light sources 1001 is arranged in a grid pattern. The light sources 1001 are arranged such that an array direction thereof is inclined at a predetermined angle θ with respect to a rotation axis of the polygon mirror 102a as a deflector.

As shown in FIG. 2, a vertical array direction of the light sources 1001 is indicated by letters a, b, c, and a lateral array direction of the light sources 1001 is indicated by numbers 1, 2, 3, 4. For example, the light source 1001 at the upper left in FIG. 2 will be referred to as a light source a1. Because the light sources 1001 are arranged on a line that is inclined by the angle θ with respect to the rotation axis of the polygon mirror 102a, adjoining light sources, e.g., the light source a1 and the light source a2, expose different scanning positions. A case is considered in which one pixel is formed by the light sources a1 and a2, i.e., one pixel is realized by two light sources in FIG. 2. For example, when a separate pixel is formed by each of the light sources a1 and a2 and a separate pixel is formed by each of the light sources a3 and a4, pixels as shown on the right side in FIG. 2 are formed as a result. When the vertical direction in FIG. 2 is defined as a sub-scanning direction, the distance between centers of adjacent pixels each formed by two light sources is about 600 dots per inch (dpi). At this time, the distance between centers of two light sources that form one pixel is about 1200 dpi, so that the light source density that is twice that of the pixel density can be achieved. Therefore, the position of the gravity center of a pixel can be shifted in the sub-scanning direction by changing a light intensity ratio of light sources that form one pixel, enabling to form a high definition image.

In the image forming apparatus 100 in the present embodiment, the optical device 102 uses a post-object type optical device in which an fθ lens is not used. In the present embodiment, light beams L are emitted from the VCSELs 200 corresponding to the number of colors of cyan (C), magenta (M), yellow (Y), and black (K). Each light beam L is reflected by the reflecting mirror 102b, the reflected light is focused by a second cylindrical lens 102c again, and the focused light is made to fall on a corresponding one of photosensitive elements 104a, 106a, 108a, and 110a thereby exposing the photosensitive elements 104a, 106a, 108a, and 110a.

In a conventional color image forming apparatus, four color images are formed by four independent optical devices (optical units); however, the image forming apparatus 100 in the present embodiment forms four color images of cyan, magenta, yellow, and black with a single optical device 102.

In the optical device 102 in the present embodiment, the polygon mirror 102a is arranged around the center of the optical device 102 and light beams for four colors are deflected in a main-scanning direction by a single polygon mirror 102a.

The VCSELs 200, optical components such as a mirror and a lens, and a synchronization detecting unit 210 are arranged symmetrically with respect to the polygon mirror 102a, and light paths for two colors are formed on each of the right and left sides of the polygon mirror 102a, so that the light beams for four colors can be deflected by the single polygon mirror 102a. In the present embodiment, the light paths for magenta and cyan are formed on the right side of the polygon mirror 102a, and the light paths for yellow and black are formed on the left side of the polygon mirror 102a in FIG. 1.

As described above, the light beam L is irradiated by using a plurality of optical components, so that timing synchronization is performed with respect to the main and sub scanning directions. In the following explanation, the main-scanning direction is defined as a scanning direction of the light beam, and the sub-scanning direction is defined as a direction perpendicular to the main-scanning direction.

The image forming unit 112 includes a magenta-color-component image forming unit 104, a cyan-color-component image forming unit 106, a yellow-color-component image forming unit 108, and a black-color-component image forming unit 110. The image forming units 104, 106, 108, and 110 include mainly the photosensitive elements 104a, 106a, 108a, and 110a, charging units 104b, 106b, 108b, and 110b, and developing units 104c, 106c, 108c, and 110c, respectively.

The photosensitive elements 104a, 106a, 108a, and 110a each include a conductive drum, made of for example aluminum, and a photoconductive layer on the conductive drum. The photoconductive layer includes at least a charge generating layer and a charge transport layer. The photoconductive layer of each of the photosensitive elements 104a, 106a, 108a, and 110a, is applied with surface charges by a corresponding one of the charging units 104b, 106b, 108b, and 110b. The charging units 104b, 106b, 108b, and 110b can be a corotron, a scorotron, a charging roller, or the like.

Static charges applied to the photosensitive elements 104a, 106a, 108a, and 110a by the charging units 104b, 106b, 108b, and 110b are imagewise exposed by the light beams L, so that an electrostatic latent image is formed on each of the photosensitive elements 104a, 106a, 108a, and 110a. The latent images are developed by the developing units 104c, 106c, 108c, and 110c each including a developing sleeve, a developer supplying roller, a regulation blade, and the like, so that a developer image is formed on each of the photosensitive elements 104a, 106a, 108a, and 110a.

The developer images are transferred onto the intermediate transfer belt 114 that moves in a direction indicated by an arrow A in FIG. 1 by conveying rollers 114a, 114b, and 114c. The intermediate transfer belt 114 is moved while it is carrying the developer images of cyan, magenta, yellow, and black.

Receiver media 124 such as a high-quality paper and a plastic sheet placed on a feeding unit (not shown) are picked up one by one from the top by a pair of feeding rollers (not shown) to be conveyed in a downstream direction B. When the receiver medium 124 conveyed from the feeding unit is detected by a registration sensor SS, the receiver medium 124 conveyed until it comes in contact with a pair of feed registration rollers 134 and then conveying of the receiver medium 124 is stopped. Furthermore, the receiver medium 124 is conveyed to a transfer roller 13 that is in contact with the conveying roller 114b by the feed registration rollers 134 at the timing registered with a multicolor developer image (full-color toner image) transferred onto the surface of the intermediate transfer belt 114. Then, the multicolor developer image on the intermediate transfer belt 114 is transferred onto the receiver medium 124 by the transfer roller 13.

The receiver medium 124 with the multicolor developer image transferred thereon is conveyed to a fixing unit 120. The fixing unit 120 fixes the multicolor developer image to the receiver medium 124 by applying heat. Then, the receiver medium 124 with the multicolor developer image is conveyed to a discharging unit (not shown) to be discharged from the apparatus.

A registration pattern read sensor 15 is provided near the conveying roller 114c and it reads an alignment pattern formed on the surface of the intermediate transfer belt 114. The alignment pattern is used to detect misalignment of the color-component image formed by each of the color-component image forming units 104, 106, 108, and 110 in the sub-scanning direction.

Figure 3:
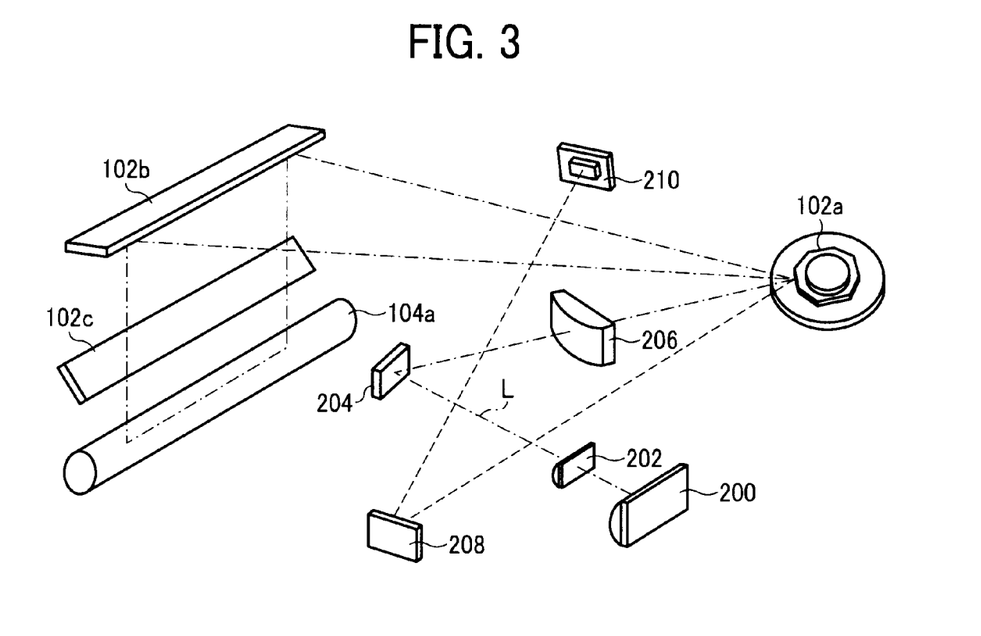
FIG. 3 is a schematic diagram illustrating a configuration of an optical device that exposes a photosensitive element shown in FIG. 1.

FIG. 3 is a schematic diagram illustrating a configuration of the optical device 102 that includes the VCSEL 200 and exposes the photosensitive element 104a. The light beam L emitted from the VCSEL 200 is focused by the first cylindrical lens 202, which is used to shape a beam bundle, passes a reflecting mirror 204 and a focusing lens 206, and is deflected by the polygon mirror 102a. The polygon mirror 102a is driven to rotate by a spindle motor or the like that rotates at thousands to tens of thousands of revolutions per minute. The light beam L reflected by the polygon mirror 102a is further reflected by the reflecting mirror 102b, reshaped by the second cylindrical lens 102c, and falls on the photosensitive element 104a to expose the photosensitive element 104a.

A reflecting mirror 208 is provided for synchronizing the timing of starting scanning with the light beam L in the sub-scanning direction. The reflecting mirror 208 reflects the light beam L to the synchronization detecting unit 210 including a photodiode before start scanning in the sub-scanning direction. When the synchronization detecting unit 210 detects the light beam L, the synchronization detecting unit 210 generates a synchronization signal for starting sub-scanning to synchronize processing such as processing of generating a drive control signal to the VCSEL 200 with the scanning in the sub-scanning direction.

The VCSEL 200 is driven by an input pulse signal, which is input to the VCSEL 200 from a GAVD 310, to expose the light beam L to the position corresponding to a predetermined image bit of image data. A latent image is formed on the photosensitive elements 104a because of this exposing.

Figure 4:
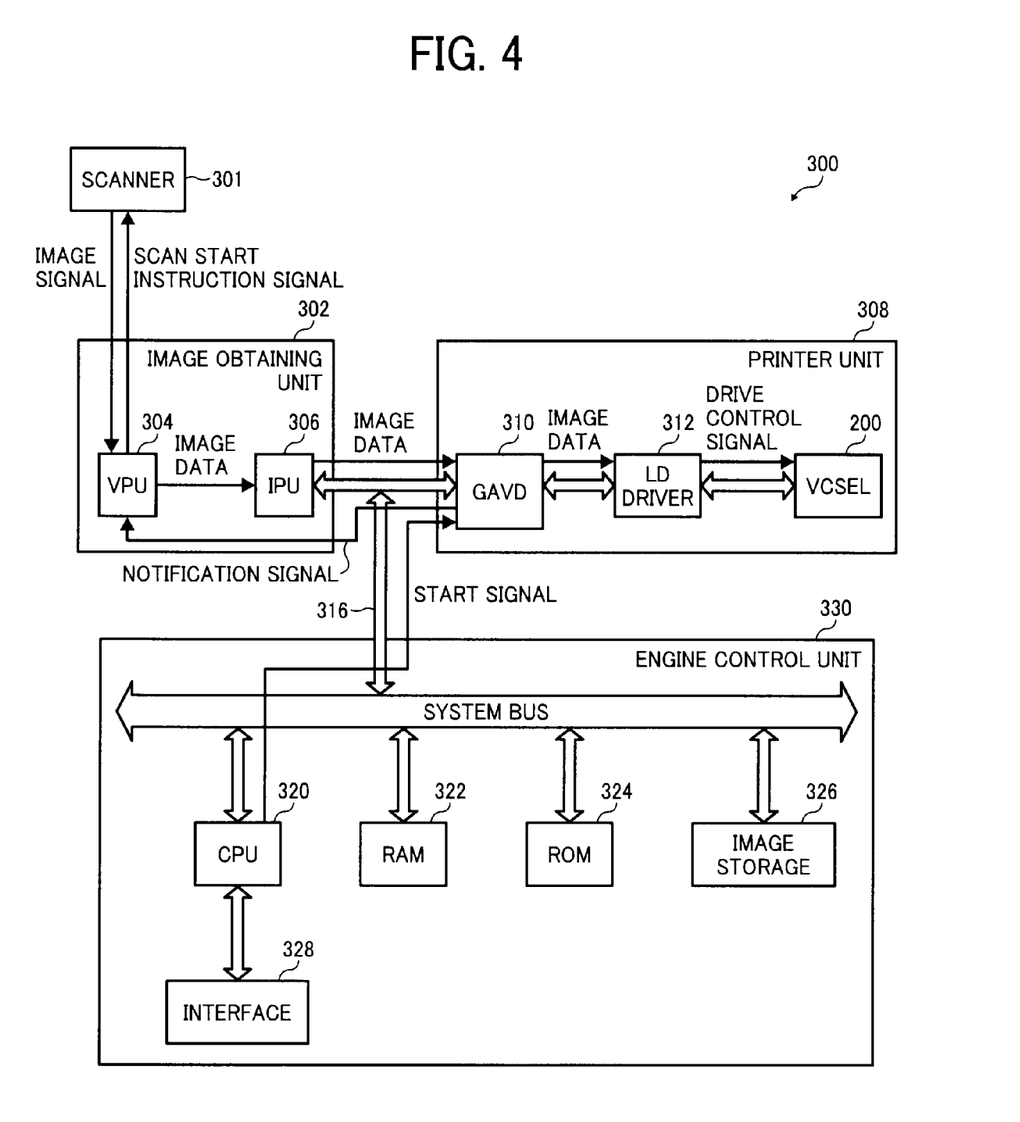
FIG. 4 is a functional block diagram of a control unit of the image forming apparatus.

FIG. 4 is a functional block diagram of a control unit 300 of the image forming apparatus 100. The control unit 300 includes an image obtaining unit 302, a printer unit 308, and an engine control unit (a main control unit) 330. The image obtaining unit 302 obtains an image signal from a scanner 301 as an image reading unit and performs image processing. Specifically, the image obtaining unit 302 includes a visual processing unit (VPU) 304 and an image processing unit (IPU) 306. The VPU 304 sends a scan start instruction signal instructing a scan process start with respect to the scanner 301. Moreover, the VPU 304 performs a black offset correction, a shading correction, and a pixel position correction after performing A/D conversion on the image signal input from the scanner 301. The IPU 306 mainly performs image processing for performing digital conversion on an obtained image signal into image data of the CMYK color system from the RGB color system. The image data processed by the image obtaining unit 302 is sent from the IPU 306 to the printer unit 308 as digital data.

The printer unit 308 includes the GAVD 310 as a VCSEL controller that controls driving of the VCSEL 200, a laser diode (LD) driver 312 that generates current (light-emitting current, threshold current, and bias current) for driving the semiconductor laser elements as the light sources by the input pulse signal generated by the GAVD 310 and supplies each current to the semiconductor laser elements, and the VCSEL 200 on which the two-dimensionally arranged semiconductor laser elements are mounted. The GAVD 310 in the present embodiment performs resolution increasing processing by dividing pixel data to correspond to a spatial size of a laser beam emitted from a semiconductor laser element of the VCSEL 200 for the image data sent from the image obtaining unit 302.

The image obtaining unit 302 and the printer unit 308 are connected to the engine control unit 330 via a system bus 316, so that image obtaining and image processing by the image obtaining unit 302 and image formation by the printer unit 308 are controlled by an instruction from the engine control unit 330. The engine control unit 330 includes a central processing unit (CPU) 320 and a random access memory (RAM) 322 that provides a work area for the CPU 320 executing processing. The CPU 320 can be any known CPU. For example, the CPU 320 can be a PENTIUM (registered trademark) series CPU, a compatible CPU thereof, a complex instruction set computer (CISC), or a reduced instruction set computer (RISC) such as a microprocessor without interlocked pipeline stages (MIPS). The CPU 320 receives an instruction from a user via an interface 328, calls a program module that executes processing corresponding to the instruction, and causes the image forming apparatus 100 to perform image processing such as copying, faxing, scanning, and image storing. The engine control unit 330 includes a read only memory (ROM) 324 that stores therein default setting data of the CPU 320, control data, a computer program, and the like to be usable by the CPU 320. An image storage 326 is a fixed or removable memory device such as a hard disk device, a secure digital (SD) card, a universal serial bus (USB) memory. The image storage 326 stores therein image data obtained by the image forming apparatus 100 to be usable for various processing by a user.

When outputting an image as an electrostatic latent image, for example, on the photosensitive elements 104a by driving the printer unit 308 for image data obtained by the image obtaining unit 302, the CPU 320 executes control of a position of the receiver medium 124 in the main and sub scanning directions. The CPU 320 outputs a start signal to the GAVD 310 to start scanning in the sub-scanning direction. When the GAVD 310 receives the start signal from the CPU 320, the GAVD 310 sends a notification signal indicating reception of the start signal to the VPU 304. When the VPU 304 receives the notification signal, the VPU 304 sends the scan start instruction signal instructing a scan process start in the sub-scanning direction to the scanner 301. An image signal obtained by the scan process by the scanner 301 is sent to the VPU 304, and is sent to the IPU 306 as image data after being subjected to the above image processing at the VPU 304. Then, after performing the digital conversion on the image data, the IPU 306 sends the image data to the GAVD 310. The GAVD 310 once inputs the image data received from the IPU 306 in a memory 340 (see FIG. 5). Thereafter, the GAVD 310 processes the image data stored in the memory 340 and outputs the processed image data to the LD driver 312. When the LD driver 312 receives the image data from the GAVD 310, the LD driver 312 generates a drive control signal for driving the VCSEL 200. Thereafter, the LD driver 312 sends the drive control signal to the VCSEL 200 to turn on each semiconductor laser element of the VCSEL 200. The LD driver 312 drives the semiconductor laser elements, for example, by the pulse-width modulation (PWM) control. The VCSEL 200 in the present embodiment includes the semiconductor laser elements for eight channels; however, the number of the channels of the VCSEL 200 is not limited thereto.

Figure 5:
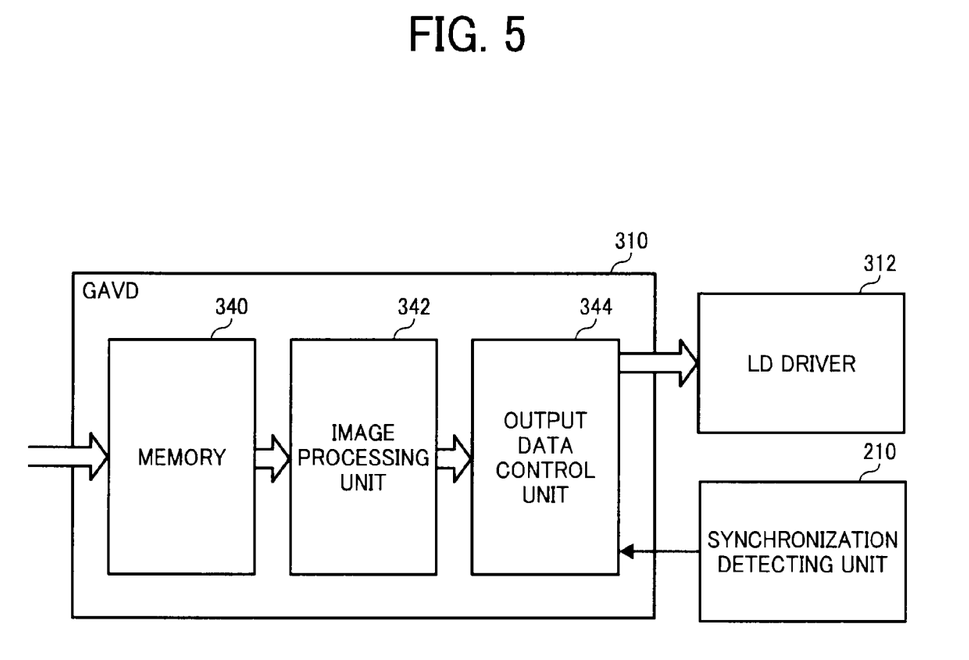
FIG. 5 is a detailed functional block diagram of a gate array of video processing (GAVD)

FIG. 5 is a detailed functional block diagram of the GAVD 310. The GAVD 310 includes the memory 340 such as a first-in first-out (FIFO) buffer that receives a synchronization signal DETP_N and stores therein image data sent from the IPU 306, and sends the image data from the IPU 306 to an image processing unit 342 in the FIFO order. The image processing unit 342 reads image data from the memory 340 and performs various processing such as a resolution conversion of the image data, an allocation of channels of the semiconductor laser elements, and addition and deletion of an image bit. The exposing position on the photosensitive elements 104a for the image data is defined by a main-scanning line address value defined in the main-scanning direction and a sub-scanning line address value defined in the sub-scanning direction.

An output data control unit 344 performs processing with the synchronization signal DETP_N that is generated by detecting the light beam emitted from the VCSEL 200 by the synchronization detecting unit 210 as a reference, and outputs an image transfer request signal MLSYNC_N for transferring raster data to the image processing unit 342 and a sub-scanning start reference signal MFSYNC_N with a system operation start signal STTRIG_N as a trigger. Moreover, the output data control unit 344 sends an input pulse signal for controlling driving of the VCSEL 200 and image data of a write target to the LD driver 312.

Figure 6:
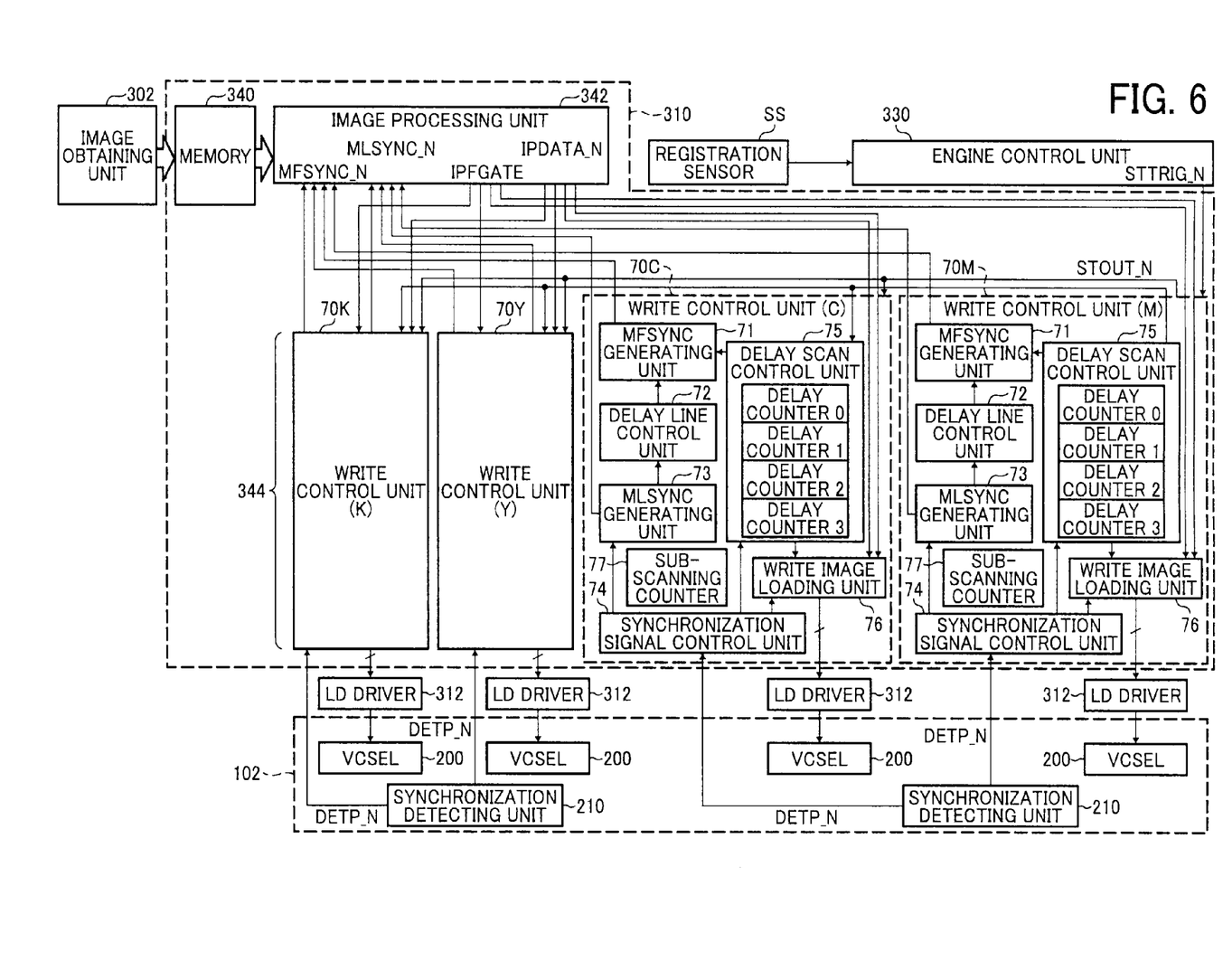
FIG. 6 is a block diagram illustrating an example of a control system according to the present embodiment.

FIG. 6 is a block diagram mainly illustrating a functional configuration of the output data control unit 344.

As shown in FIG. 6, the output data control unit 344 includes write control units 70M (magenta), 70C (cyan), 70Y (yellow), and 70K (black) for respective colors. The engine control unit 330, which controls the entire image forming apparatus 100, sets an operation mode for each of the write control units 70M, 70C, 70Y, and 70K. The engine control unit 330 performs various settings for the write control units 70M, 70C, 70Y, and 70K and sets a reference color from among the four colors.

In the present embodiment, magenta (M) of which image is formed first is set to the reference color in consideration of the arrangement shown in FIG. 1. In FIG. 6, the write control unit 70M corresponding to magenta (M) as the reference color and the write control unit 70C corresponding to cyan (C) as one of subordinate colors are specifically shown. The write control units 70Y and 70K corresponding to yellow (Y) and black (K) as the other subordinate colors each have the same configuration as the write control unit 70C, so that they are not specifically shown in FIG. 6.

Magenta is set as the reference color in the present embodiment. However, the reference color can be set depending on the positional relationship between the magenta-color-component image forming unit 104, the cyan-color-component image forming unit 106, the yellow-color-component image forming unit 108, and the black-color-component image forming unit 110 (see FIG. 1).

As shown in FIG. 6, each of the write control units 70M, 70C, 70Y, and 70K mainly includes a synchronization signal control unit 74, an MLSYNC generating unit 73, a delay line control unit 72, an MFSYNC generating unit 71, a delay scan control unit 75, a write image loading unit 76, and a sub-scanning counter 77. The sub-scanning counter 77 is explained in detail later. Each of the write control units 70M, 70C, 70Y, and 70K further includes a sub-scanning delay scan register mfdly_r (not shown) and a sub-scanning delay line register mfsyncpos_r (not shown) that are connected to the engine control unit 330 by a register read/write line (not shown).

In the present embodiment, the write control units 70M, 70C, 70Y, and 70K are realized by hardware with these units and the registers; however, the functions of the write control units 70M, 70C, 70Y, and 70K can be realized by a computer program executed by a CPU provided to the write control units 70M, 70C, 70Y, and 70K.

The engine control unit 330 outputs the system operation start signal STTRIG_N to the write control unit 70M at the timing of detecting a printing sheet position by the registration sensor SS provided near the feed registration rollers 134. Color components other than the reference color are set as the subordinate color. The system operation start signal STTRIG_N is a signal that is generated based on the detection signal from the registration sensor SS and indicates a start of the printing operation.

In the present embodiment, because the write control unit 70M is the write control unit for the reference color, a rising edge of the system operation start signal STTRIG_N received from the engine control unit 330 is held (latched) and a write-control-unit operation start signal STOUT_N is output to each of the write control units 70C, 70Y, and 70K corresponding to the subordinate colors at a specific timing at which scanning of each color is managed. The specific timing of outputting the write-control-unit operation start signal STOUT_N is the timing at which the synchronization signal DETP_N and a scanning synchronization signal lclr are not generated for all colors.

The write control units 70C, 70Y, and 70K each count the scanning synchronization signal lclr with the write-control-unit operation start signal STOUT_N as a trigger. The scanning synchronization signal lclr is a signal which is generated by the synchronization signal control unit 74 and in which a pulse is generated for one surface of the polygon mirror 102a of which timing is controlled by the synchronization signal control unit 74 of each of the write control units 70C, 70Y, and 70K with the synchronization signal DETP_N detected by the synchronization detection unit (detection sensor) 210 as a reference.

The engine control unit 330 detects a position in the sub-scanning direction at which a latent image for each color to be transferred onto the intermediate transfer belt 114 is formed is detected in advance and calculates the delay timing (a period 702 in FIG. 7) for forming each of images for cyan, yellow, and black from the reference color (magenta) based on the detected position by a computer program executed in the CPU 320. The engine control unit 330 detects the position in the sub-scanning direction, for example, based on the reading status of an alignment pattern for each color by the registration pattern read sensor 15.

Moreover, the engine control unit 330 adds a conveying delay time (a period 701 in FIG. 7) calculated based on the positional relationship between the registration sensor SS and the position at which a magenta image is transferred to the calculated delay timing. Then, the engine control unit 330 replaces the image forming delay time (a period obtained by adding the period 701 to the period 702) for each color as an addition result with the number of delay sub-scans as the number of scans in the sub-scanning direction and the number of delay sub-scanning lines as the number of lines in the sub-scanning direction. Then, the engine control unit 330 sets the value of the number of delay sub-scans for each color to the sub-scanning delay scan register mfdly_r, and sets the value of the number of delay sub-scanning lines to the sub-scanning delay line register mfsyncpos_r. For example, when the image forming delay time is replaced by (n scans+m lines) (n and m are integers), the register value n is set to the sub-scanning delay scan register mfdly_r, and the register value m is set to the sub-scanning delay line register mfsyncpos_r.

The MLSYNC generating unit 73 generates the image transfer request signal MLSYNC_N indicating an image transfer request and sends it to the image processing unit 342 and the delay line control unit 72.

The delay line control unit 72 counts the number of generations of the image transfer request signal MLSYNC_N by the MLSYNC generating unit 73 in a scan cycle in which a plurality of lines in the main-scanning direction is scanned at the same time, and notifies the MFSYNC generating unit 71 that what number the image transfer request signal MLSYNC_N signal is output in divided areas in each scan cycle.

The delay scan control unit 75 includes delay counters 0 to 3 (mfcount0 to 3) for controlling the delay timing, and controls the number of delay scans by the delay counters 0 to 3 (mfcount0 to 3). The delay scan control unit 75 loads a counter initial value at the timing of the write-control-unit operation start signal STOUT_N and decrements the scanning synchronization signal lclr by the delay counters mfcount0 to 3, and controls the number of delay scans in the sub-scanning direction by the count value.

Specifically, in the delay scan control unit 75, one of the delay counters mfcount0 to 3 selected by the write-control-unit operation start signal STOUT_N loads a register value of the sub-scanning delay scan register mfdly_r as an initial value. Then, the delay scan control unit 75 decrements the count value of the selected one of the delay counters mfcount0 to 3 for every detection of the scanning synchronization signal lclr. When the count value reaches zero, i.e., when the number of generations of the scanning synchronization signal lclr becomes equal to the number of delay sub-scans, the delay scan control unit 75 notifies the MFSYNC generating unit 71 of that effect.

When the MFSYNC generating unit 71 for each color is notified from the delay scan control unit 75 that the count value of the delay counters mfcount0 to 3 has reached zero, the MFSYNC generating unit 71 requests image transfer to the image processing unit 342 by outputting the sub-scanning start reference signal MFSYNC_N indicating a reference for starting printing in the sub-scanning direction with respect to the image processing unit 342 at the timing at which the information indicating what number the image transfer request signal MLSYNC_N notified from the delay line control unit 72 is in the divided areas divided by the number of lines in the scan cycle in which a plurality of lines in the main-scanning direction is scanned at the same time matches the register value of the sub-scanning delay line register mfsyncpos_r.

The image processing unit 342 receives input image data loaded from the image obtaining unit 302 via the memory 340 and stores image data obtained by performing various image processing based on the input image data. The image processing unit 342 outputs an image-data valid sub gate signal IPFGATE and an image signal IPDATA_N indicating stored image data to the write control units 70M, 70C, 70Y, and 70K with the sub-scanning start reference signal MFSYNC_N input from the write control units 70M, 70C, 70Y, and 70K for respective colors as a reference. Specifically, the image processing unit 342 outputs the image-data valid sub gate signal IPFGATE and transfers the image signal IPDATA_N for a plurality of lines (e.g., 8 to 10 lines) to be written simultaneously in units of line in accordance with the image transfer request signal MLSYNC_N after receiving the sub-scanning start reference signal MFSYNC_N.

The write image loading unit 76 in each of the write control units 70M, 70C, 70Y, and 70K loads the image signal IPDATA_N as the image data signal into a two-dimensional image signal in the main and sub scanning directions with the scanning synchronization signal lclr as a reference, and supplies it to the LD driver 312.

The LD driver 312 drives the semiconductor laser elements of the VCSEL 200 based on the input two-dimensional image signal. Consequently, image light for a plurality of lines is output in one scanning.

Figure 7:
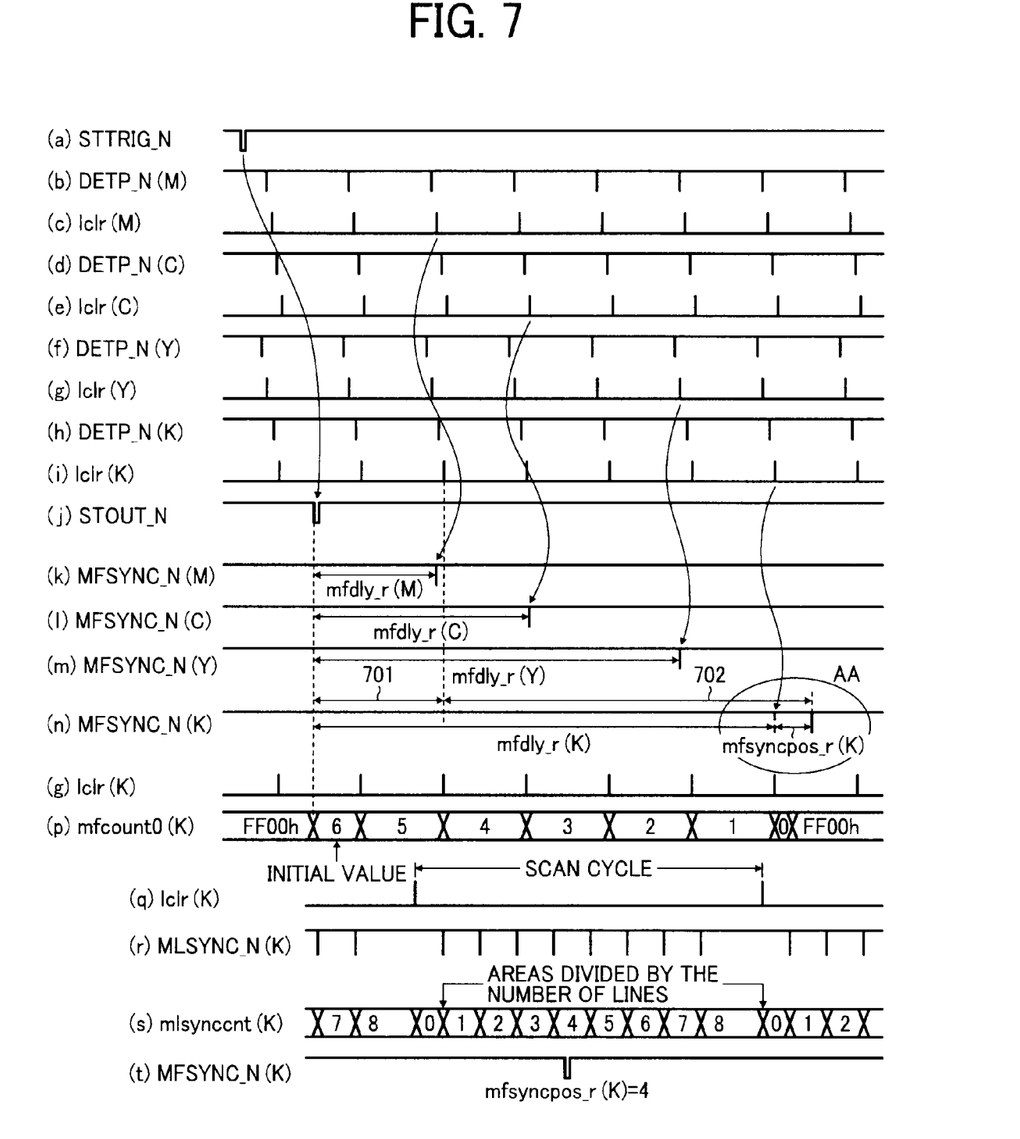
FIG. 7 is a timing chart illustrating an example of a job start control of the image forming apparatus.

FIG. 7 is a timing chart illustrating a job start control of the image forming apparatus 100. FIG. 7 assumes a case in which eight semiconductor laser elements are provided for each color and scanning for eight lines is performed in one scan cycle, so that eight image transfer request signals MLSYNC_N (in units of line) to be output to the image processing unit 342 are generated in one scan cycle.

The engine control unit 330 outputs the system operation start signal STTRIG_N to the write control unit 70M at the timing of detecting a printing sheet position by the registration sensor SS. Then, the write control unit 70M outputs the write-control-unit operation start signal STOUT_N at the timing (the above-described specific timing) at which the synchronization signal DETP_N and the scanning synchronization signal lclr are not generated for all colors (see Japanese Patent Application Laid-open No. 2005-178080). In the present embodiment, images are formed in the order of magenta, cyan, yellow, and black, so that the register value of the sub-scanning delay scan register mfdly_r for each color is set to have the relationship of mfdly_r(M)<mfdly_r(C)<mfdly_r(Y)<mfdly_r(K).

When the 70M outputs the write-control-unit operation start signal STOUT_N, the delay scan control unit 75 in each of the write control units 70M, 70C, 70Y, and 70K selects a delay counter to be operated from among the delay counters mfcount0 to 3 for delay scan control. The selection of the driver counter is configured to switch in a toggle sequence for each job printing sheet. In other words, when the delay counter mfcount0 is selected by receiving the first system operation start signal STTRIG_N, the delay counter mfcount1 is selected for the next system operation start signal STTRIG_N. FIG. 7 shows a case in which the delay counter mfcount0 is selected as an example.

When the delay counter mfcount0 is selected at the time of generating the write-control-unit operation start signal STOUT_N, the register value of the sub-scanning delay scan register mfdly_r is loaded to the count value of the delay counter mfcount0 as an initial value. In the example of (p) in FIG. 7, the number of delay scans of "6" is set to the sub-scanning delay scan register mfdly_r, so that the value of "6" is loaded to a delay counter mfcount0 (K) as an initial value. After loading the counter initial value, the delay counter mfcount0 is decremented for each surface of the polygon mirror 102a with the scanning synchronization signal lclr of a corresponding color as a counter clock. In the scan cycle at which the count value of the delay counter mfcount0 reaches zero, the MFSYNC generating unit 71 outputs the sub-scanning start reference signal MFSYNC_N to the image processing unit 342 at the output timing at which the number of the image transfer request signals MLSYNC_N output in the scan cycle is equal to the mfsyncpos_r.

In the present embodiment, in order to form an image without displacing an image writing position in the sub-scanning direction at the write image loading unit 76 that two-dimensionally loads the image signal IPDATA_N on a printing sheet based on the system operation start signal STTRIG_N that is input at the asynchronous timing detected by the registration sensor SS, the write-control-unit operation start signal STOUT_N is generated with the synchronization signal DETP_N as a reference and the number of delay scans in the sub-scanning direction is controlled for each color by using the scanning synchronization signal lclr as the main-scanning reference signal with the timing of generating the write-control-unit operation start signal STOUT_N as a source, whereby color registration timing in the sub-scanning direction for each color can be controlled.

In (q) to (t) in FIG. 7, an operation of the delay scan control unit 75 for black in a circled portion AA in (n) in FIG. 7 is shown as an example. At the time of inputting the write-control-unit operation start signal STOUT_N from the write control unit 70M for magenta as the reference color to the write control unit 70K for black, the value of the mfdly_r (K) as the initial value is loaded to the delay counter mfcount0 (K). In FIG. 7, the mfdly_r (K) is 06h. The delay counter mfcount0 (K) is decremented by one every time a scanning synchronization signal lclr (K) is input. In the scan cycle in which the delay counter mfcount0 (K)=0h, a sub-scanning start reference signal MFSYNC_N (K) is output at the timing at which the number of the image transfer request signals MLSYNC_N output in the scan cycle is equal to the mfsyncpos_r. In other words, the sub-scanning start reference signal MFSYNC_N (K) is output at the timing at which the number of the image transfer request signals MLSYNC_N is equal to the mfsyncpos_r in areas divided by the number of lines in the scan cycle in which a plurality of lines in the main-scanning direction is scanned at the same time.

After outputting the sub-scanning start reference signal MFSYNC_N (K), the delay counter mfcount0 (K) ends the decrement operation and transfers to FF00h that indicates a standby state. Because the sub-scanning delay scan registers mfdly_r (M), mfdly_r (C), mfdly_r (Y), and mfdly_r (K), and the sub-scanning delay line registers mfsyncpos_r (M), mfsyncpos_r (C), mfsyncpos_r (Y), and mfsyncpos_r (K) are provided for respective colors, the sub-scanning timing from the write-control-unit operation start signal STOUT_N to the sub-scanning start reference signal MFSYNC_N for each color can be arbitrary adjusted in units of line by setting a value appropriate for each color.

In the present embodiment, with the system operation start signal STTRIG_N as a reference, the sub-scanning delay timing from the write-control-unit operation start signal STOUT_N that does not detect the synchronization signal DETP_N for all colors to the generation of the sub-scanning start reference signal MFSYNC_N to the image processing unit 342 is adjusted by loading the initial value with the write-control-unit operation start signal STOUT_N as a source by the delay counters mfcount0 to 3 for control provided independently for each color and decrementing the count value, so that the sub-scanning registration position for each color can be adjusted in units of scan. Moreover, the sub-scanning registration position for each color can be adjusted in units of line by controlling a position at which the sub-scanning start reference signal MFSYNC_N is output in a scan cycle.

Moreover, in the present embodiment, the sub-scanning counter 77 that counts the number of scans in outputting an image is provided and the counter of the sub-scanning counter 77 is used as an address in the sub-scanning direction of an internal pattern generated in each of the write control units 70M, 70C, 70Y, and 70K. The internal pattern is used to detect a displacement amount of a writing position between respective colors. A method for detecting the displacement amount is well known, so that explanation thereof is omitted.

The sub-scanning counter 77 loads a counter initial value at the timing of the scanning synchronization signal lclr next to an image transfer start (IPFGT_N signal assert) from the image processing unit 342, and thereafter, counts up the number of lines scanned in one scan cycle for every input of the scanning synchronization signal lclr. The write control units 70M, 70C, 70Y, and 70K generate internal patterns with the counter value mlsynccnt of the sub-scanning counter 77 as an address in the sub-scanning direction.

Furthermore, in the present embodiment, when the position at which the sub-scanning start reference signal MFSYNC_N is generated is shifted to an arbitrary position in the scan cycle by the setting of the sub-scanning delay line register mfsyncpos_r=0, the initial loading value of the sub-scanning counter 77 is obtained by subtracting the mfsyncpos_r from the initial loading value. With this setting, because the counter value of the sub-scanning counter 77 matches the coordinate in the sub-scanning direction of data input from the image processing unit 342, it is possible to align an image signal from the image processing unit 342 to the position of the internal pattern generated by the write control units 70M, 70C, 70Y, and 70K in the sub-scanning direction.

Figure 8A:
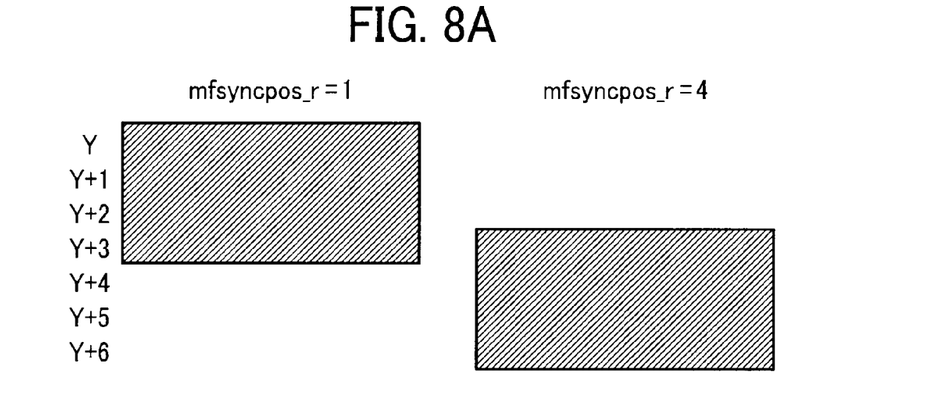
FIG. 8A is a schematic diagram for explaining an output position of image data input from an image processing unit shown in FIG. 5.
Figure 8B:
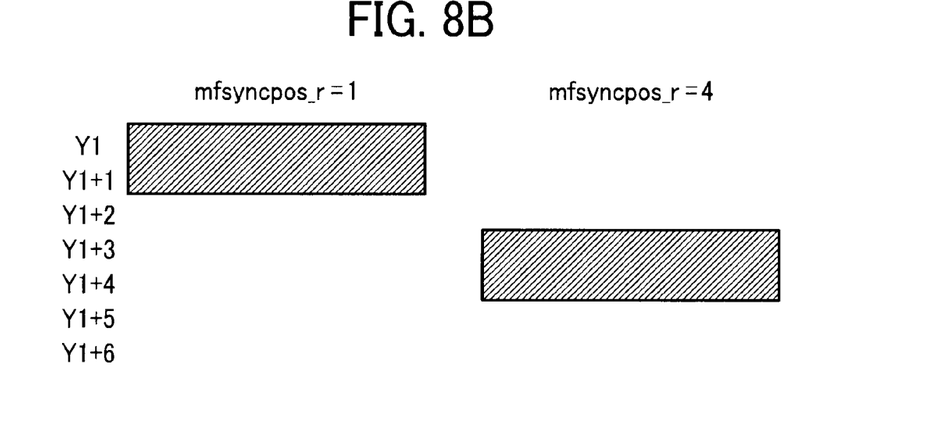
FIG. 8B is a schematic diagram for explaining an output position of an internal pattern when an initial load value of a sub-scanning counter is changed in accordance with a value of a sub-scanning delay line register.

FIG. 8A is a schematic diagram for explaining an output position of image data input from the image processing unit 342. As shown in FIG. 8A, the position in the sub-scanning direction shifts in accordance with the setting of the sub-scanning delay line register mfsyncpos_r. FIG. 8B is a schematic diagram for explaining an output position of an internal pattern when an initial load value of the sub-scanning counter 77 is changed in accordance with the value of the sub-scanning delay line register mfsyncpos_r. In the present embodiment, by changing the initial load value of the sub-scanning counter 77 in accordance with the value of the sub-scanning delay line register mfsyncpos_r as shown in FIG. 8B, the counter value of the sub-scanning counter 77 shifts by the amount corresponding to the shift amount of the output position of input image data in the sub-scanning direction, so that the shift amount of the output position of the image data from the image processing unit 342 in the sub-scanning direction is in conjunction with the shift amount of the internal pattern generated by using the counter value of the sub-scanning counter 77 in the sub-scanning direction.

Figure 9:
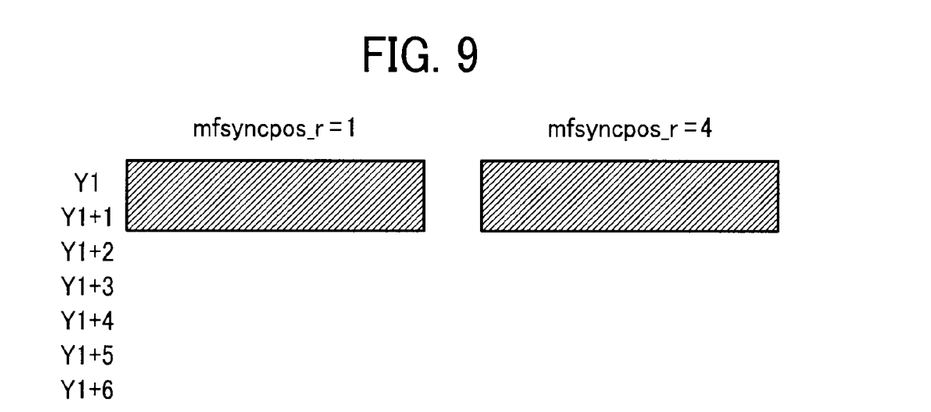
FIG. 9 is a schematic diagram for explaining an output position of an internal pattern in a conventional example.

FIG. 9 is a schematic diagram for explaining an output position of an internal pattern in a conventional technology in which the initial load value of the sub-scanning counter is not changed. In the conventional technology, as shown in FIG. 9, the position of the internal pattern in the sub-scanning direction is not in conjunction with the input image data, so that it is needed to separately manage or adjust the position of the internal pattern in the sub-scanning direction by the engine control unit 330, thereby making the control complex.

According to the present embodiment, the sub-scanning start reference signal MFSYNC_N can be output for each of areas divided by the number of lines to be scanned simultaneously in the main-scanning cycle, and the timing of outputting the sub-scanning start reference signal MFSYNC_N is changed in units of divided area, so that it is possible to change the printing operation start position in units of line in the sub-scanning direction and adjust the sub-scanning registration position for each color in units of line.

Moreover, according to the present embodiment, the sub-scanning start reference signal MFSYNC_N can be output for each of areas divided by the number of lines to be scanned simultaneously in the main-scanning cycle, and the initial value of the sub-scanning counter is changed depending on which divided area's timing the sub-scanning start reference signal MFSYNC_N is output. Therefore, the counter value of the sub-scanning counter matches the coordinate of data input from the image processing unit 342 in the sub-scanning direction. Thus, it is possible to align an image signal from the image processing unit 342 to the position of the internal pattern generated by the write control units 70M, 70C, 70Y, and 70K in the sub-scanning direction.

According to an aspect of the present invention, when forming an electrostatic latent image by scanning a plurality of lines in every scanning, a sub-scanning registration position can be adjusted in units of line.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   an image processing unit that performs image processing on image data as an image forming target;
   a plurality of light sources that is controlled to be driven to emit light beams;
   an image forming unit that forms a latent image of the image data on an image carrier by scanning the image carrier with a plurality of light beams corresponding to a plurality of lines in a main-scanning direction simultaneously; and
   a write control unit that, upon receiving an instruction of starting an image forming operation, sends a sub-scanning start reference signal indicating a reference of start of an image formation in a sub-scanning direction to the image processing unit, and that, upon receiving the image data from the image processing unit, starts control of driving the light sources for each of a plurality of colors, wherein
   upon receiving the sub-scanning start reference signal, the image processing unit transfers the image data on which the image processing is performed to the write control unit, and
   the write control unit changes a printing operation start position in the sub-scanning direction in units of line by controlling to output the sub-scanning start reference signal at timing of any one of a plurality of areas divided by number of lines that are scanned simultaneously in a scan cycle in a main-scanning direction.

2. The image forming apparatus according to claim 1, further comprising a control unit that calculates a delay time of image formation for each color based on a timing from image formation for a reference color to image formation for other colors, and replaces the delay time with number of delay sub-scans that is number of scans in the sub-scanning direction and number of delay sub-scanning lines that is number of lines in the sub-scanning direction, wherein
   the write control unit includes
      an image transfer signal generating unit that generates an image transfer request signal indicating a transfer request for the image data;
      a synchronization signal control unit that generates a scan synchronization signal;
      a delay scan control unit that counts the scan synchronization signal; and
      a sub-scanning start reference signal generating unit that, when the count obtained at the delay scan control unit becomes equal to the number of delay sub-scans and information indicating what number the image transfer request signal is in the areas in the scan cycle matches the number of delay sub-scanning lines, outputs the sub-scanning start reference signal to the image processing unit.

3. The image forming apparatus according to claim 2, wherein
   the delay scan control unit includes a delay counter that decrements the number of delay sub-scans as an initial value every time the scan synchronization signal is detected, and, when a count value of the delay counter reaches zero, notifies the sub-scanning start reference signal generating unit that the count value reaches zero, and
   the sub-scanning start reference signal generating unit determines that the scan synchronization signal becomes equal to the number of delay sub-scans when notified that the count value reaches zero.

4. The image forming apparatus according to claim 2, further comprising a delay line control unit that counts the image transfer request signal and notifies the sub-scanning start reference signal generating unit of information indicating what number the image transfer request signal is in the areas in the scan cycle.

5. The image forming apparatus according to claim 2, wherein the control unit further detects an image forming position in the sub-scanning direction for each color and calculates the delay timing based on detected image forming position.

6. The image forming apparatus according to claim 1, wherein the write control unit further changes an initial value of a sub-scanning counter in accordance with an output of the sub-scanning start reference signal.

7. The image forming apparatus according to claim 1, wherein the light source is a surface emitting laser.

8. An image forming method that is performed in an image forming apparatus that includes a plurality of light sources that is controlled to drive to emit light beams; and an image forming unit that forms a latent image of image data as an image forming target by scanning with a plurality of light beams corresponding to a plurality of lines in a main-scanning direction simultaneously, the image forming method comprising:

performing image processing on the image data by an image processing unit; and write controlling including sending a sub-scanning start reference signal indicating a reference of start of an image formation in a sub-scanning direction to the image processing unit by a write control unit upon receiving an instruction of starting an image forming operation, and starting control of driving the light sources for each of a plurality of colors by the write control unit upon receiving the image data from the image processing unit, wherein the performing includes transferring the image data on which the image processing is performed from the image processing unit to the write control unit upon receiving the sub-scanning start reference signal, and the write controlling includes changing a printing operation start position in the sub-scanning direction in units of line by controlling to output the sub-scanning start reference signal at timing of any one of a plurality of areas divided by number of lines that are scanned simultaneously in a scan cycle in a main-scanning direction.

* * * * *